Aug. 28, 1962  H. L. KUHLENSCHMIDT ET AL  3,051,323
BOOM MECHANISM AND CONTROL
Filed Nov. 1, 1960  6 Sheets-Sheet 1

Harold L. Kuhlenschmidt
Floyd E. Kuhlenschmidt
Arthur Geiselman
Arnold Geiselman
INVENTORS Harold L. Kuhlenschmidt
Floyd E. Kuhlenschmidt
Arthur Geiselman
Arnold Geiselman
INVENTORS

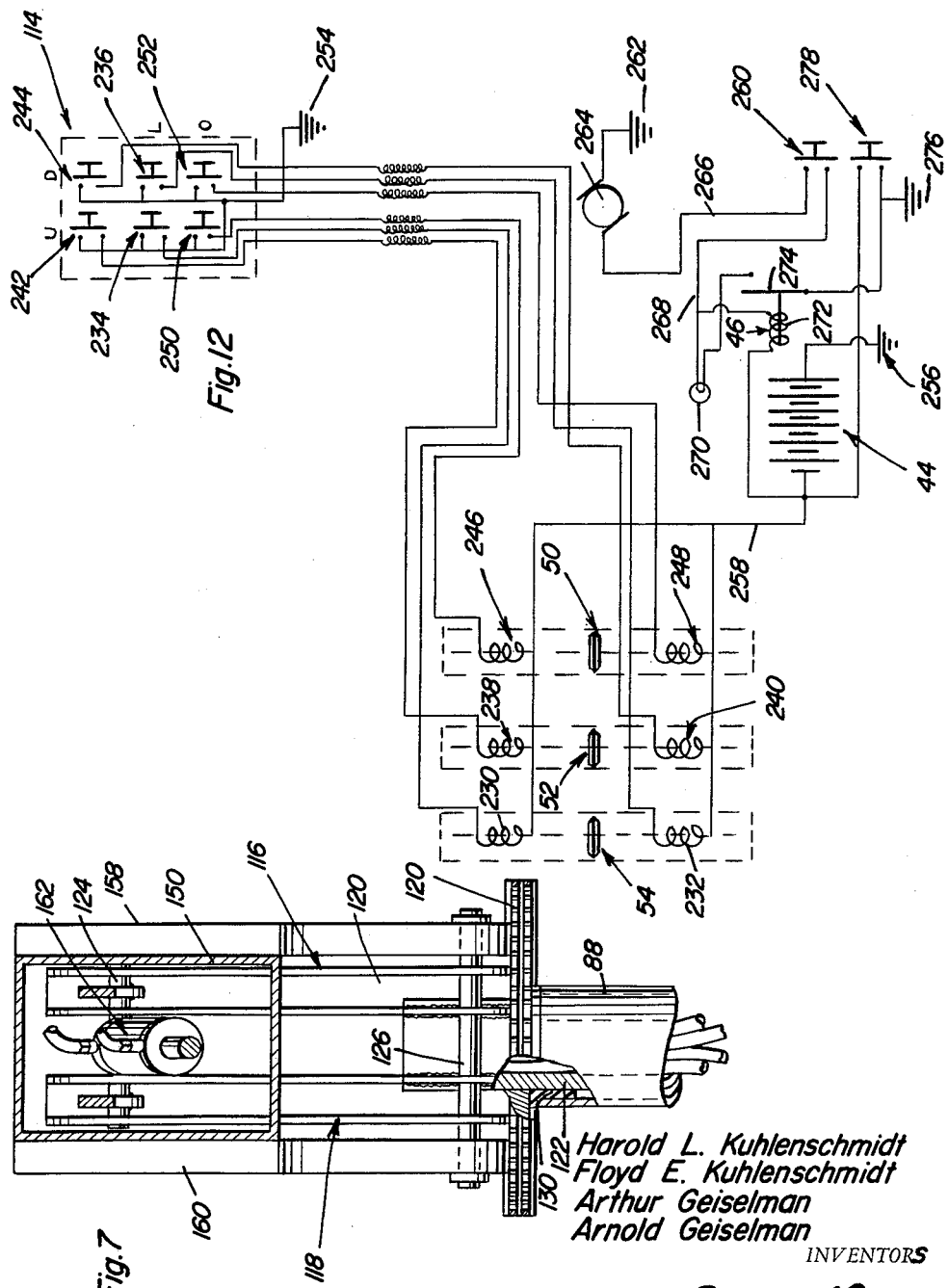

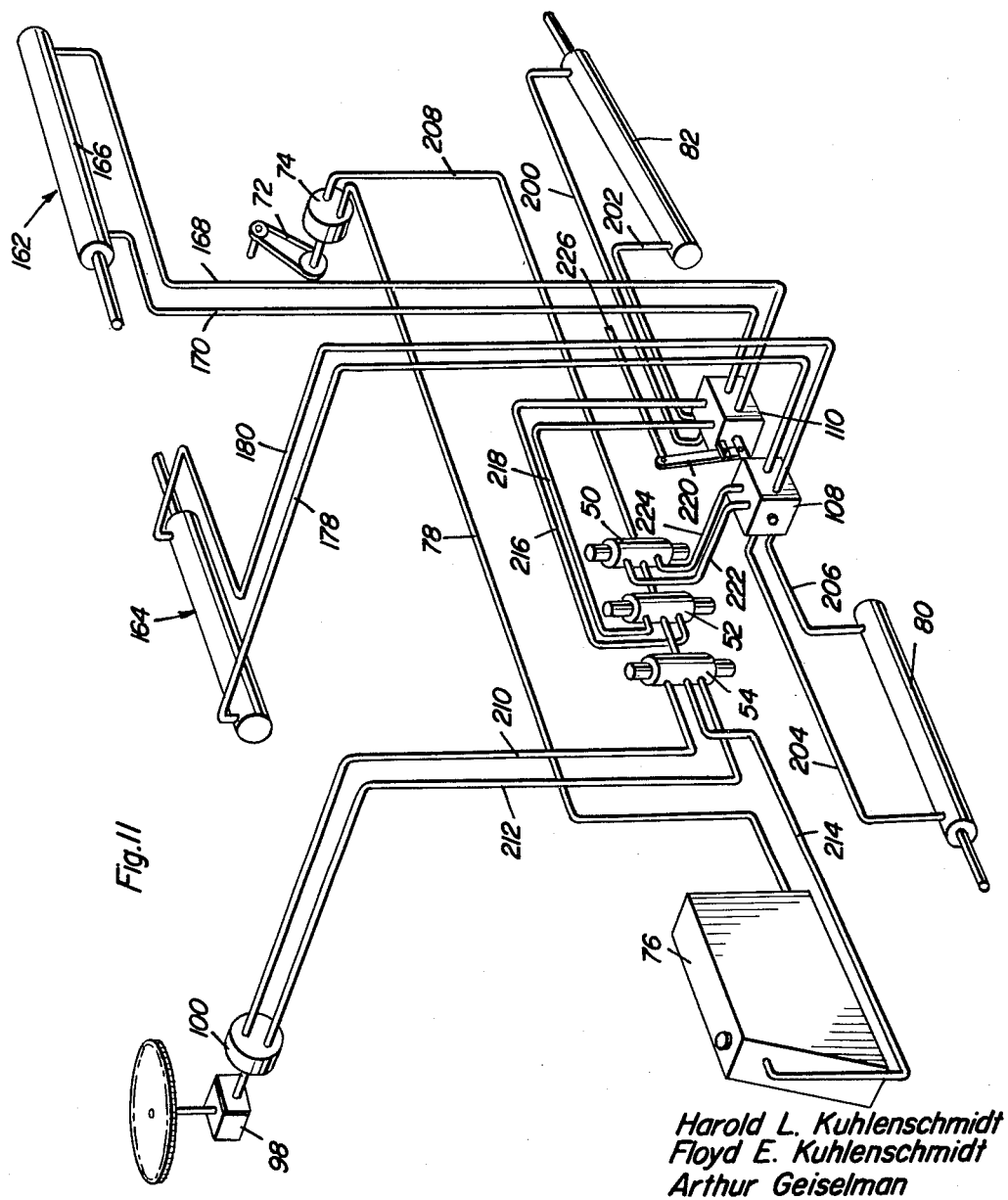

United States Patent Office 3,051,323
Patented Aug. 28, 1962

3,051,323
BOOM MECHANISM AND CONTROL
Harold L. Kuhlenschmidt, Floyd E. Kuhlenschmidt, Arthur Geiselman, and Arnold Geiselman, all of Elberfeld, Ind., assignors to Elberfeld Manufacturing Co., Inc., Elberfeld, Ind., a corporation of Indiana
Filed Nov. 1, 1960, Ser. No. 66,636
19 Claims. (Cl. 212—35)

The present invention relates to a self-contained and remotely controllable boom mechanism.

The primary object of this invention is to provide a boom mechanism which is of such compact and novel design that it may be mounted at any desired installation such as on a truck bed frame requiring no other equipment for operation thereof.

Another object of this invention is to provide a boom mechanism capable of being accurately controlled by a remote control system whereby the operator may more conveniently directly supervise the operation of the boom by standing adjacent to the load being handled by the boom mechanism. The advantage of such a system is clearly evident over previous boom mechanism arrangements wherein the operator was at a disadvantage by being restricted to a fixed location in order to effect the control operation over the boom mechanism. The control system of the present invention is therefore arranged to facilitate completely centralized control over all working parts of the assembly.

A further object of this invention is to provide a boom mechanism having a conveniently designed mounting frame whereby both stabilizer mechanisms may be extended therefrom or retracted thereagainst in an out-of-the-way location under control of the remote control device and a selector.

A still further object of this invention is to provide a boom mechanism having elevational control mechanism and load pick up control mechanism entirely disposed within the boom assembly and boom pivot assembly for more efficient and convenient mounting and operation.

The boom mechanism of this invention therefore includes a mounting frame assembly on which all of the power and control equipment for the boom mechanism is located. Accordingly, an internal combustion engine is mounted within the frame assembly and is drivingly connected to a hydraulic pump of a hydraulic control system which includes a plurality of solenoid operated valves for supplying fluid under pressure generated by the pump to the hydraulic motor drivingly connected to the boom pivot assembly for rotation thereof. Also hydraulic piston mechanism located within the boom assembly may be supplied with fluid from the pump through a hose swivel connection so as to control the elevation of the boom assembly and load pick up therefrom. Also, the hydraulic control mechanisms are located within the frame assembly for actuation of the load stabilizer units which are retracted up against the inclined end portion of the frame assembly. Also provided is an electrically operated remote control system battery energized for operating the solenoid controlled valve. The remote control switch box accordingly may effect selective energization of any of the solenoids for valve actuation. The electrical control system is also related with the start and stop pushbutton switches mounted on an engine control box which also includes the choke control therefor. The electrical control system will also control actuation of the load stabilizer units when a pair of selector valves are manually conditioned by a selector lever mounted on the frame assembly.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a sectional view of an upper portion of the boom mechanism.

FIGURE 6 is a partial sectional view of the boom mechanism showing the boom portion thereof in a partially elevated position relative to the boom pivot assembly.

FIGURE 7 is a sectional view taken through a plane indicated by section line 7—7 in FIGURE 5.

FIGURE 8 is a sectional view taken through a plane indicated by section line 8—8 in FIGURE 5.

FIGURE 9 is an enlarged partial sectional view of the hose swivel unit connected to the boom pivot assembly.

FIGURE 10 is a perspective view of the anchoring foot portion of the load stabilizer unit.

FIGURE 11 is a schematic illustration of the hydraulic control system for the boom mechanism.

FIGURE 12 is a schematic circuit diagram of the remotely controlled electrical control system for the boom mechanism.

Figure 2:
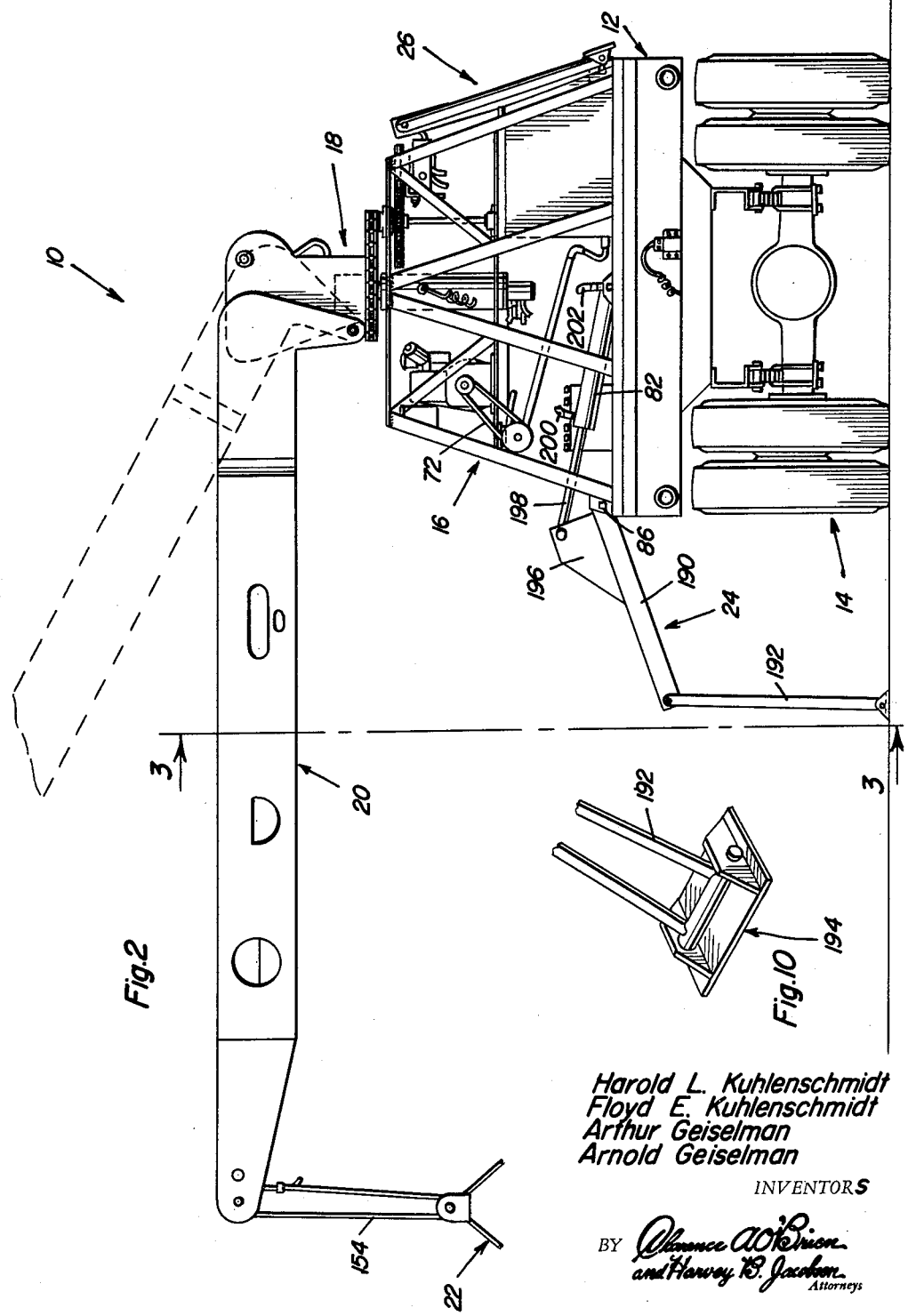
FIGURE 2 is a side elevational view of the boom mechanism shown mounted on a truck bed frame.

Referring now to the drawings in detail, FIGURE 2 illustrates more completely the boom mechanism which is generally referred to by reference numeral 10 and illustrated in FIGURE 2 as mounted on a bed frame 12 of a truck vehicle 14. It will therefore be observed that the boom mechanism 10 is provided with a mounting frame assembly 16 which is suitably bolted to the truck bed frame 12. The mounting frame assembly 16 mounts therein the power and control equipment for the boom mechanism and also swivelly mounts therein the boom pivot assembly which extends thereabove and is generally referred to by reference numeral 18. As will be hereafter explained with greater detail, the boom pivot assembly 18 is capable of being rotated 360 degrees. Pivotally mounted on the boom pivot assembly is the boom assembly generally referred to by reference numeral 20, the boom 20 accordingly including at an outer end thereof a load pick up unit 22. As seen in FIGURE 2, by dotted lines, the boom 20 is capable of being elevated or pivoted relative to the boom pivot assembly 18. Also provided on the boom mechanism 10 are a pair of load stabilizer units 24 and 26 capable of being extended into ground engaging position or retracted in folded condition against the mounting frame assembly 16. The load stabilizer unit 24 is shown in its extended anchoring position while the load stabilizer unit 26 is shown in its retracted position.

*Mounting Frame Assembly*

Figure 3:
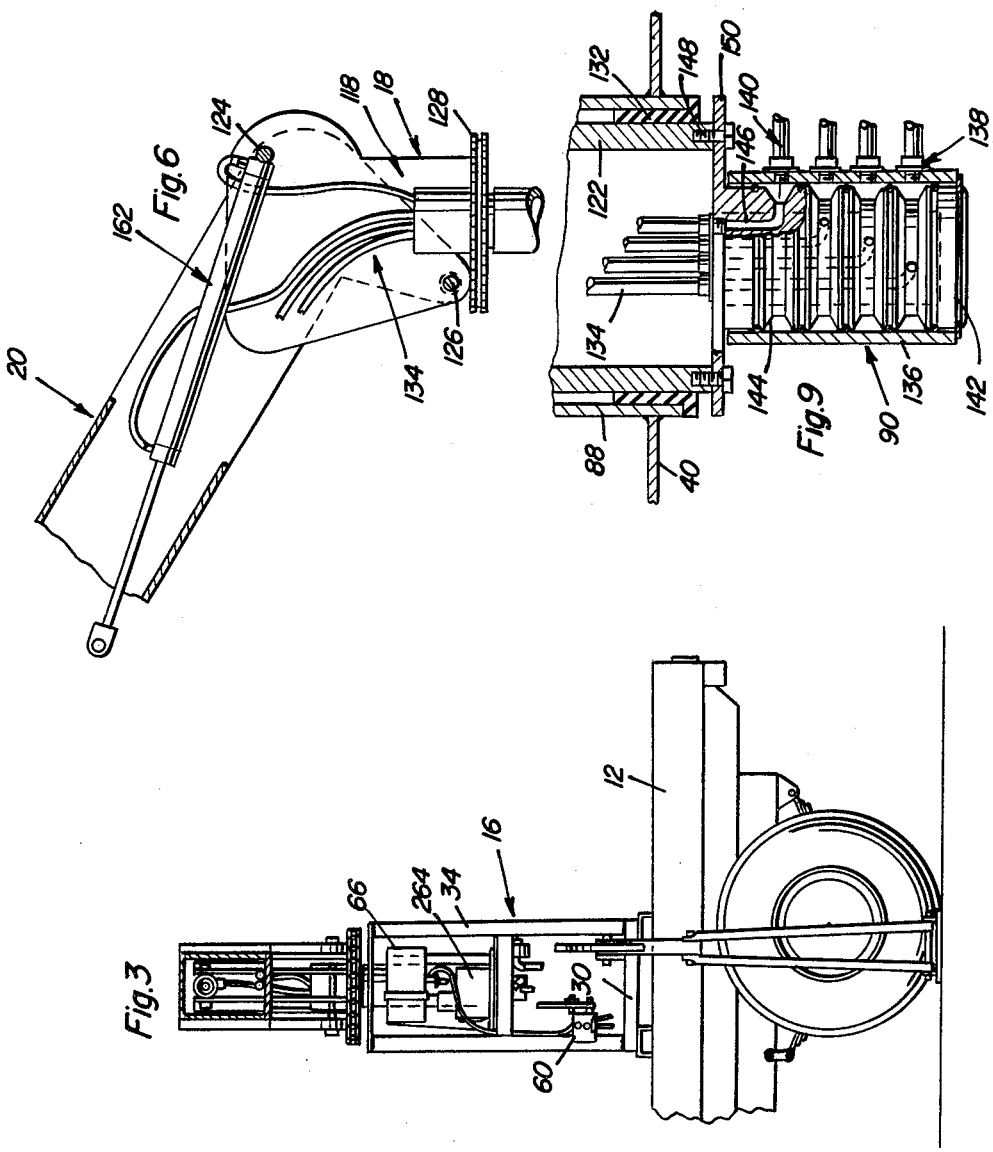
FIGURE 3 is a sectional view taken through a plane indicated by section line 3—3 in FIGURE 2.
Figure 4:
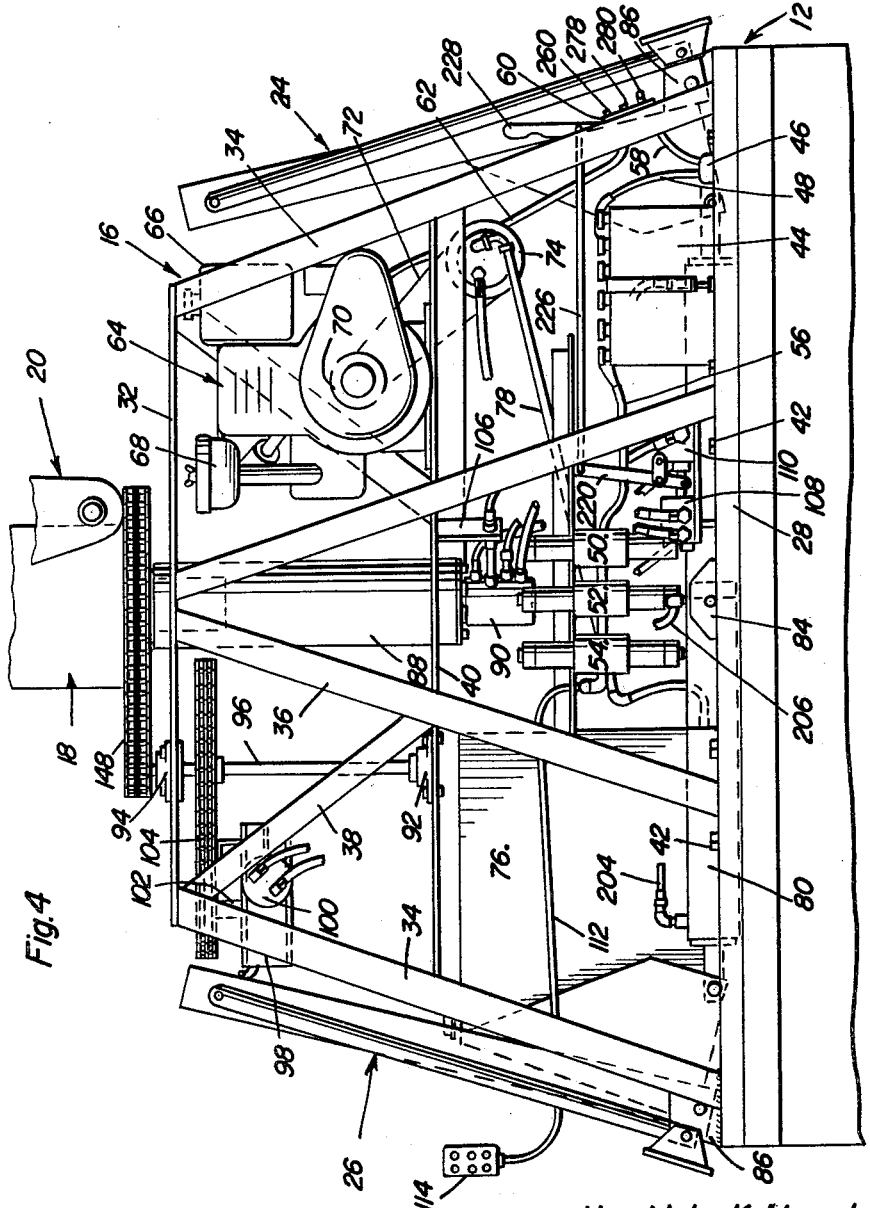
FIGURE 4 is an enlarged partial elevational view of a lower portion of the boom mechanism.

Referring now to FIGURES 3 and 4 in particular it will be observed that the mounting frame assembly includes two parallel sides interconnected, the sides being arranged in the form of a trapezoid. The bottom of the mounting frame assembly is formed by tubular framing members including a pair of parallel side portions 28 which are interconnected by a pair of end portions 30. A top plate member 32 is disposed in parallel spaced relation above the bottom frame portion formed by the members 28 and 30 and is connected thereto by four tubular corner post members 34 to form the trapezoid arrangement between the top plate member 32 and the side base members 28.

Intermediate bracing members 36 are provided between the corner post members 34 to further interconnect the top plate member 32 and the side base members 28. Additional suitable bracing such as members 38 are provided for rendering the mounting frame assembly 16 rigid. It will also be observed that an intermediate plate member 40 is provided between the base portion and top plate member 32 in order to mount additional equipment within the mounting frame assembly 16. The base frame portion of the mounting frame assembly which is defined between the members 28 and 30 will be suitably attached to a base or in the exemplary case illustrated the bed of a truck frame by suitable fasteners such as bolts 42. Mounted on the base is a 12-volt battery 44 from which the power source for the electrical control system is derived. A solenoid switch mechanism 46 is mounted adjacent thereto and connected to one of the terminals of battery 44 by battery cable 48. Also mounted in spaced relation above the base portion of the mounting assembly are three solenoid operated valve mechanism 50, 52 and 54 which are connected to the other terminal of the battery 44 by battery cable 56. Also connected to the solenoid switch mechanism 46 by cable 58 is the engine control box 60 which is mounted on one of the mounting frame assembly corner posts 34. An ignition wire cable 62 therefore connects the engine control box 60 to an internal combustion type engine generally indicated by reference numeral 64 which is mounted on the intermediate plate member 40 to one side of the mounting frame assembly 60. It will be appreciated that the engine 64 is of conventional design and includes for example its own fuel tank 66, carburetor 68 and an output pulley 70 which is belt connected by means of an endless drive belt 72 to a hydraulic pump mechanism 74 mounted below the intermediate plate member 40.

Mounted on the other side of the mounting frame assembly 16 as viewed in FIGURE 4, opposite from the engine 64, pump 74 and battery 44, is a fluid reservoir tank 76 which is mounted on the bottom portion of the mounting frame assembly. It will be noted that the pump 74 is hydraulically connected by conduit 78 to the reservoir tank 76. Also mounted on the base portion of the mounting frame assembly are a pair of hydraulic actuating mechanisms 80 and 82 as more clearly seen in FIGURES 4 and 2 respectively, which mechanism 80 and 82 are pivotally connected to the mounting frame assembly at the inner ends thereof by pivot bracket 84. As will hereafter be explained, the mechanisms 80 and 82 are operatively connected to the load stabilizer units 24 and boom 26. In connection with the load stabilizer units pivot bracket 86 are secured to the base portion of diagonally opposite frame post members 34 for the purpose of pivotally connecting the load stabilizer unit to the frame assembly.

Referring now to the intermediate plate member 40 as seen in FIGURE 4, it will be observed that a vertically disposed tubular member 88 is mounted between the intermediate member 40 and the top plate member 32. A swivel hose connection assembly 90 is mounted below the tubular member 88 and below the intermediate plate member 40. As will hereafter be explained with greater detail, the swivel hose unit 90 affords means for connecting a plurality of fluid conduits to a lower projecting portion of the boom pivot unit 18 disposed within the tubular member 88 fixed between the plate members 40 and 32 as by welding. Also, mounted respectively on the plate members 40 and 32 are a pair of flange block bearing units 92 and 94 between which the jack shaft 96 is rotatably mounted. Also mounted on the frame assembly adjacent to the jack shaft 92 is a gear reducer mechanism 98 to which a fluid motor 100 is connected. The output shaft 102 from the gear reducer 98 driven by the fluid motor 100 is belt connected by endless chain belt drive 104 to the jack shaft 96 which in turn includes an upper portion projecting above the top plate member 32 for belting connection of the jack shaft 96 to the boom pivot assembly 18 as will hereafter be further explained.

It will also be noted from FIGURE 4, that various hose connections and electrical conduit connections interconnect the equipment mounted within the mounting frame assembly 16. For example a mounting bracket 106 is provided for connecting some of the hoses to the swivel hose unit 90 and other hose connections are shown connecting a pair of selector valve mechanism 108 and 110 which are mounted on the bottom portion of the mounting frame assembly to the fluid conduit which is connected to the swivel unit 90. It will also be observed that the solenoid valve mechanism in addition to being connected to the battery cable 56 are also connected by electrical conduit 112 to a remote control switch box 114. The electric cable 112 it should be understood, may be of any desired length so that the operator can control the boom mechanism through the remote control box 114 at any desired location relative thereto. The functional relationship of the equipment mounted within the frame assembly 16 will be set forth with greater detail hereafter, the foregoing description being an examplary arrangement for the mounting of all of the power equipment and control equipment and load stabilizers within the mounting frame assembly 16.

*Boom Pivot Assembly*

Referring to FIGURES 6, 7 and 9 in particular it will be observed that the boom pivot assembly 18 includes an upper portion formed by a pair of parallel side units 116 and 118, each unit 116 and 118 being formed by a pair of parallel plate members interconnected at the rear thereof by connecting portions 120 as more clearly seen in FIGURE 7. The units 116 and 118 which are disposed above the mounting frame assembly are interconnected as by welding to an elongated tubular member 122 which extends downwardly through the tubular member 88 which is fixed between the intermediate and upper plate members of the frame assembly as hereinbefore indicated. Also interconnecting the parallel units 116 and 118 are a pair of shaft members 124 and 126, the shaft member 124 being disposed adjacent the top of the boom pivot assembly while the other shaft member 126 is disposed adjacent the bottom of the upper portion thereof. The double sprocket gear 128 is also fastened as by welding to the bottom of the units 116 and 118 and to the tubular shaft 122 which is fixed thereto. The tubular member 122 is rotatably mounted within the frame tubular member 88 and is journalled between bushings 130 and 132 disposed respectively at the upper and lower ends of the fixed tubular member 88. A plurality of hose connections 134 are disposed within the inner tubular member 122 and rotatable therewith for the purpose of fluid supply to the hydraulic mechanism located within the boom 20.

Referring now to FIGURE 9 in particular, it will be noted that the swivel hose unit 90 includes a fixed outer tubular member 136 to which a plurality of fittings 138 are connected for fixedly connecting to the tubular member 136 a plurality of fluid conduits 140. The swivel hose unit 90 also includes a rotatable portion 142 which has a plurality of annular recesses 144 therein providing an annular space which communicates with the fittings 138 which constitute fluid inlet connections. The plurality of drill passages 146 are disposed within the member 142 each of the passages 146 communicating with a different annular space 144. Accordingly, each of the passages 146 communicates with the different inlet conduit 140 at all times and yet is rotatable with the member 142. The member 142 is accordingly bolted to the bottom of the tubular member 122 by means of a plurality of bolt fasteners 148 which interconnect the tubular member 122 rotatable with the pivot assembly 18 to a flange portion 150 of the rotatable swivel member 142.

It will be recalled that the jack 96 as seen in FIGURE 4 is belt connected to the boom pivot assembly 18. The double sprocket gear 128 connected to the bottom of the upper portion of the assembly 18 therefore has enmeshed therewith the endless double sprocket belt chain 148. A double sprocket wheel is accordingly also connected to the upper end of the jack shaft 96 for meshing engagement with the endless chain belt 148 so that the fluid motor 100 operating through the gear reducer 98 may impart rotation to the assembly 18 by rotation of the output shaft 102 which is belt connected by endless belt 104 to the jack shaft 96 which in turn is drive belt connected to the assembly 18 as hereinabove indicated. From the foregoing, it will be apparent that the assembly 18 may be power driven and is rotatably mounted with respect to the frame assembly for 360 degrees rotation. Also, the fluid connection for the hydraulic mechanism located within the boom 20 which is connected to the boom pivot assembly 18 and rotatable therewith will be accommodated by the swivel unit 90 as hereinbefore described in detail.

Boom Assembly

Figure 1:
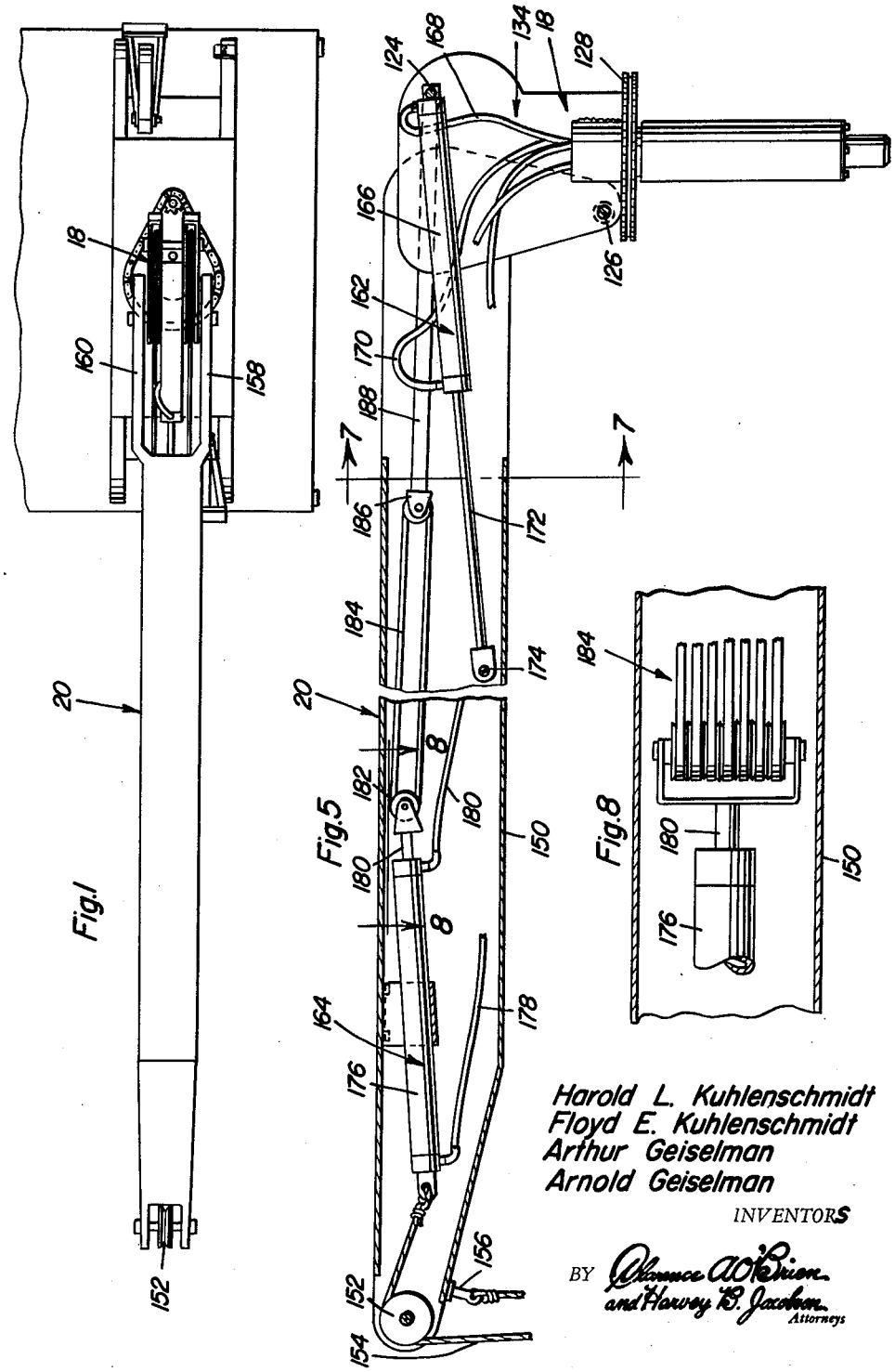
FIGURE 1 is a top plan view of the boom mechanism of this invention.

Referring now to FIGURES 1, 5 and 8 in particular it will be observed that the boom 20 includes an elongated tubular portion 150 of rectangular cross section. Rotatably mounted at the outer end of the elongated portion 150 is a pulley 152 about which a load pick up cable 154 is entrained. As more clearly seen from FIGURE 2, the cable 154 is trained about a pulley disposed within the load pick up unit 22 so that one end thereof is connected to a dead-end anchor swivel 156 mounted on the other side of the elongated boom section 150. The other end of the boom 20 includes a pair of parallel arms 158 and 160 which straddle the boom assembly 18 and are connected to the shaft 126 extending therethrough. Accordingly, the boom 20 is pivotally mounted on the assembly 18 and is rotatable therewith. It will therefore be noted that the hydraulic hose 134 extends upwardly from the tubular member 122 into the upper portion of the assembly 18 and into the boom 20 itself for connection to a boom elevation mechanism 162 and a load pick up mechanism 164.

The boom elevation mechanism 162 is constituted by a hydraulic cylinder mechanism including the hydraulic cylinder 166 with the hydraulic conduits 168 and 170 connected to the opposite ends thereof for fluid actuation of the pistons disposed within the cylinder 166 for extending or retracting relative to the cylinder the piston rod 172. It will be noted that the outer end of the piston rod 172 is pivotally connected to an intermediate portion of the boom at 174 while the opposite end of the mechanism 166 is pivotally connected at the shaft 124 within the boom pivot assembly 18. Accordingly, by extending or retracting the piston with respect to the cylinder 166 pivotal movement of the boom 20 will be effected relative to the boom pivot assembly 18. The boom 20 may therefore be pivotally moved between a position as illustrated in FIGURE 5 for example to a position as illustrated in FIGURE 6. By suitable control of the fluid admitted either into conduit 168 or conduct 170, pivotal movement of the boom relative to the boom pivot assembly may be effected.

It will be noted that the end of the load pick up cable 154 opposite the dead-end anchor end is connected to one end of a cylinder 176 of the load pick up mechanism 164. The cylinder 176 accordingly has a pair of hydraulic conduits 178 and 180 connected to opposite ends thereof for admission of fluid under pressure thereto so as to control the position of a piston disposed within the cylinder 176 to which the piston rod 180 is connected. A multi-sheave pulley unit 182 as more clearly seen in FIGURE 8 is connected to the end of the piston rod 180 by means of which the piston rod 180 is flexibly connected by the multi-strand belt unit 184 to a pulley unit 186 which is mounted on a member 188 pivotally connected to the shaft 124 disposed within the upper end of the boom pivot assembly. Accordingly, by retracting or extending the piston rod 180 with respect to the cylinder 176, the cable 154 may be raised or lowered for load pick up purposes. Selective control of hydraulic fluid into conduit 178 or 180 may thereby control operation of the mechanism 164.

Load Stabilizer Unit

It will be recalled that the pivot brackets 86 which are welded to diagonally opposite corner posts 34 of the mounting frame assembly 16 pivotally connect the load stabilizer units 24 and 26 to the frame assembly. Referring therefore to FIGURE 2 in particular, it will be observed that the load stabilizer unit 24 for example includes lever arm 190. Pivotally connected to the outer end of the lever arm 190 are a pair of rod link members 192 to which a foot member 194 is connected at the lower end as more clearly seen in FIGURE 10. Projecting from one side of the lever arm member 190 is a connecting member 196 to which the piston rod 198 extending from the cylinder 182 is pivotally connected. It will therefore be observed that connected to the opposite ends of the cylinder 82 are fluid conduits 200 and 202 for the purpose of either extending or retracting the piston rod 198 within the cylinder 82 so as to extend or retract the load stabilizer unit 24. A pair of conduits 204 and 206 are provided and connected to opposite ends of the cylinder 80 for similar purposes with respect to the other load stabilizer unit 26 as more clearly seen in FIGURE 4. It will therefore be appreciated that by selective control of the fluid admitted to the conduit 200, 202, 204 and 206, the load stabilizer unit 24 and 26 may be extended or retracted. When retracted, the stabilizer units 24 and 26 will be folded up against the sides of the frame assembly 16 inasmuch as the sides thereof are inclined rearwardly.

Hydraulic Control System

Referring now to FIGURE 11 in particular a schematic layout of the hydraulic control system for the boom mechanism is illustrated. It will therefore be observed that the internal combustion engine 64 drives the pump 74 through the belt 72 so that fluid may be drawn by means of the suction line 78 from the fluid reservoir 76. The pump 74 therefore discharges fluid under pressure into discharge line 208 in order to supply fluid under pressure to the valve mechanisms 50, 52 and 54. The valve mechanisms 50, 52 and 54 when in a neutral position will not supply fluid under pressure from the conduit 208 to any of the operating components. When however the valve mechanism 54 is actuated in one direction, fluid under pressure from the discharge line 208 will be supplied for example to fluid motor line 210 which also includes a second line 212 connected thereto so that the fluid will return from the fluid motor 100 when supplied thereto by line 210. Line 212 under such conditions will be connected by the valve 54 to the return line 214. The fluid motor 100 will therefore operate in one direction of rotation to impart drive in one direction to the gear reducer 98 for rotation of the boom pivot assembly 18. When the valve mechanism 54 is actuated in the opposite direction however, fluid under pressure will be supplied through the line 212 and returned from the fluid motor through line 210 for connection to return line 214 by the valve mechanism 54. The fluid motor 100 will then operate in the opposite direction of rotation. Accordingly, by actuating the control valve mechanism 54 in one or the other direction, the directional control over the pivot assembly 18 may be effected.

If the valve mechanism 52 is actuated in one or the other direction from a neutral position, fluid under pressure from pump discharge line 208 will be admitted into line 216 or line 218. Lines 216 and 218 are connected to a selector valve mechanism 110 which may be manually conditioned by displacement of the control lever 220 from a neutral position to a stabilizer extension position so as to connect the lines 216 and 218 to the conduits 170 and 168 respectively, which conduits are connected to opposite ends of the cylinder 166 of the boom elevation control mechanism 162. Accordingly, by actuating the valve mechanism 52 in one or the other direction fluid will be admitted to the conduit 170 or 168 in order to control the direction of pivotal movement of the boom. When the selector lever 220 is moved to an extension or retraction position however, the selector valve 110 will then be operative to connect both lines 216 and 218 with either conduit 200 or 202 of the cylinder 82 for the purpose of extending or retracting the load stabilizer unit 24 on one side of the assembly in response to operation of valve 52.

When the valve mechanism 50 is actuated in either direction, fluid under pressure from the pump discharge conduit 208 will be admitted to lines 222 and 224 which are connected to the selector valve mechanism 108. Accordingly, by positioning of the selector lever 220 to a neutral position between the valves 108 and 110, the selector valve mechanism 108 will be so conditioned that the lines 222 and 224 will be hydraulically connected to the hydraulic conduits 178 and 180 respectively for control of the load pick up mechanism 164. When the selector lever 220 is in an extension retraction position, the selector valve mechanism 108 will then be operative to connect both conduits 222 and 220 to either the supply conduit 204 or 206 for controlling the load stabilizer unit 26 by actuation of the cylinder 80 to complete stabilization of the assembly in response to operation of valve 50.

It will therefore be appreciated that by controlling the actuation in one or the other direction of each of the valve mechanisms 50, 52 and 54 the fluid motor may be operated in either direction for rotational swivelling of the boom pivot assembly 18, for boom elevation control and for load pick up control. Also, by selective actuation of the selector lever 220 in one or the other direction from a mid-position the selector valve mechanism 108 and 110 may be so conditioned as to control the load stabilizer units 24 and 26 instead of the mechanisms 162 and 164. It will therefore be observed that the selector lever 220 as seen in FIGURE 4 is link connected by link 226 to a stabilizer control lever 228 pivotally mounted on the frame assembly.

*Remotely Controlled Electrical Control System*

Referring now to FIGURE 12 it will be observed that the valve mechanisms 50, 52 and 54 are each actuated by a pair of solenoids which when energized will actuate the valve in one or the other direction for effecting the control functions hereinbefore mentioned. It will therefore be observed that the valve 54 includes a pair of solenoid coils 230 and 232 which are respectively energized by current from the battery 44 upon closing of pushbutton switch 234 and switch 236 respectively. The valve mechanism 52 is similarly actuated in one or the other direction by solenoid coils 238 and 240 energized respectively when the pushbutton switches 240 and 242 are closed. Valve mechanism 50 is also actuated by the energization of solenoid coils 246 and 248 which are respectively energized upon closing of switches 250 and 252. The pushbutton switches 234, 236, 242, 244, 250 and 252 are mounted within the remote control switch box 114. It will be observed therefore that one of the terminals of each of the push button switches are connected to ground 254, so that upon closing of any one of the switches a circuit will be closed between the ground 254 and the ground 256 connected to the opposite terminal of the battery 44. The live terminal of the battery 44 opposite the ground connection 256 is therefore connected in parallel to each of the solenoid coils of the solenoid valve mechanisms by conductor 258.

It will also be noted from FIGURE 12 that the battery 44 supplies current for starting the engine 64. Accordingly, upon depression of the starter button 260 which is mounted on the engine control box 60 as seen in FIGURE 4, a circuit is closed between ground connection 262 to the starter motor 264 which is thereby connected through line 266 and the switch 260 to an ignition line 268 of ignition 270 for the engine 64. Connected to the line 268 is the coil 272 of the relay switch device 46 which in turn is connected to the live terminal of the battery 44. Accordingly, the starter motor 264 is energized while at the same time the coil 272 of the relay switch 46 is energized to close the relay switch member 274. Upon closing of the switch 274, a circuit will be closed between ground 256 through the battery 44, coil 272, line 268, ignition 270, switch 274 to ground 276. Accordingly, the ignition 270 will be energized from the battery even after the starter button is released. Upon release of the starter button 260 of course, the motor 264 will be deenergized, it being presumed that the engine has already started up. In order to stop operation entirely, stop button 278 may be depressed which will ground the live battery terminal and thereby deenergize everything. The stop button is also mounted on the engine control box 60 as seen in FIGURE 4 which control box 60 also includes the usual choke control 280 for the engine 64.

From the foregoing, operation and utility of the boom mechanism of this invention will be apparent. It will therefore be appreciated that the boom mechanism may be accurately and completely controlled with the movement and control being more closely supervised by the operator by virtue of the remote control feature. Also, of particular advantage is the self-contained nature of the mechanism requiring no other equipment or connection other than the proper mounting thereof on some base. Also by virtue of the novel structural arrangement of the parts and equipment within the mounting flame and the hydraulic power mechanisms within the boom assembly itself, a more compact and efficiently operating boom mechanism is realized.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, failing within the scope of the invention as claimed.

What is claimed as new is as follows:

1. A self-contained boom assembly adapted to be mounted on a base comprising, mounting frame means, frame stabilizer means pivotally connected to the mounting frame means selectively conditioned for engagement with the ground from a folded position against the frame means, boom pivot means swively mounted by the frame means, tubular boom means pivotally connected to the boom pivot means, extensible boom elevation means operatively connected to the boom means and pivot means and completely enclosed by the boom means and pivot means for all positions of the boom means relative to the pivot means, extensible load pickup means operatively mounted and enclosed within the boom means, load engaging means operatively connected to the load pickup means, selectively operable power means operatively connected to the pivot means, elevation means, load pickup means and stabilizer means and remote control means operatively connected to the power means for constant rotational control of the pivot means, relative to the frame means, and alternative stabilization control of the frame means and position control of the boom means and the load-engaging means.

2. The combination of claim 1 wherein said frame means includes inwardly inclined side portions against which the stabilizer means pivotally connected at a bottom of the frame means, is foldably retracted.

3. The combination of claim 2, wherein said boom pivot means includes a swivelly mounted housing within which one end of the boom elevation and pickup means are pivotally connected about a common pivot axis.

4. The combination of claim 3, wherein said boom means includes one end portion pivotally connected to the pivot means in straddling relation thereto.

5. The combination of claim 4, wherein said extensible boom elevation means includes a hydraulic piston mechanism pivotally connected at opposite ends to the boom means and pivot means respectively, and operative to pivotally displace the boom means relative to the pivot means in response to extension for retraction of the piston mechanism within the bom means.

6. The combination of claim 5 wherein said extensible load pickup means comprises hydraulically actuated means flexibly connected at opposite ends to the boom pivot means and load engaging means respectively.

7. The combination of claim 6, wherein said power means comprises, a power plant mounted on the frame means, fluid pressure generating means mounted on the frame means and drivingly connected to the power plant, hydraulic motor means drivingly connected to the boom pivot means, selectively conditioned fluid actuator means operatively connected to the stabilizer means and hydraulic connecting means operatively connecting the fluid generating means to the boom elevation means, load pickup means, hydraulic motor means and alternatively to the fluid actuator means.

8. The combination of claim 7, wherein said remote control means includes solenoid-controlled valve means in said hydraulic connecting means and battery-operated circuit means operatively connected to said solenoid-controlled valve means and remote control switch means operatively connected to the circuit means.

9. The combination of claim 8, including manually operable means operatively connected to the power means for rendering the remote control means effective to alternatively actuate the stabilizer means.

10. The combination of claim 1, wherein said boom pivot means includes a swivelly mounted housing within which one end of the boom elevation and pickup means are pivotally connected about a common pivot axis.

11. The combination of claim 1, wherein said boom means includes one end portion pivotally connected to the pivot means in straddling relation thereto.

12. The combination of claim 1, wherein said extensible boom elevation means includes a hydraulic piston mechanism pivotally connected at opposite ends to the boom means and pivot means respectively, and operative to pivotally displace the boom means relative to the pivot means in response to extension or retraction of the piston mechanism within the boom means.

13. The combination of claim 1, wherein said extensible load pickup means comprises hydraulically actuated means flexibly connected at opposite ends to the boom pivot means and load engaging means respectively.

14. The combination of claim 1, wherein said power means comprises, a power plant mounted on the frame means, fluid pressure generating means mounted on the frame means and drivingly connected to the power plant, hydraulic motor means drivingly connected to the boom pivot means, selectively conditioned fluid actuator means operatively connected to the stabilizer means and hydraulic connecting means operatively connecting the fluid generating means to the boom elevation means, load pickup means, hydraulic motor means and alternatively to the fluid actuator means.

15. The combination of claim 1, wherein said remote control means includes solenoid-controlled valve means in said hydraulic connection means and battery-operated circuit means operatively connected to said solenoid-controlled valve means and remote control switch means operatively connected to the circuit means.

16. The combination of claim 1, including manually operable means operatively connected to the power means for rendering the remote control means effective to alternatively actuate the stabilizer means.

17. A self-contained boom assembly, comprising, frame means, pivot means swivelly mounted by the frame means, boom means pivotally mounted on the pivot means, power operated means entirely enclosed within the boom means for load pickup and boom elevation control and remotely actuated control means operatively connected to the power operated means for operation thereof.

18. A self-contained boom assembly adapted to be mounted on a base comprising, mounting frame means, boom pivot means swivelly mounted by the frame means, tubular boom means pivotally connected to the boom pivot means, extensible boom elevation means operatively connected to the boom means and pivot means and completely enclosed by the boom means and pivot means for all positions of the boom means relative to the pivot means, extensible load pickup means operatively mounted and enclosed within the boom means, and load engaging means operatively connected to the load pickup means.

19. In a self-contained boom assembly having stabilizer means, a rotational control mechanism for a boom member from which a load engaging device extends and positional control mechanisms for the boom member and load engaging device, remote control means comprising constantly operative rotational control means effective to rotationally re-position the boom member about a vertical axis, positional control means alternatively operative to re-position the positional control mechanisms with respect to a common horizontal pivot axis, and selectively operable means for rendering said positional control means operative to re-position the positional control mechanisms or alternatively operative to control said stabilizer means.

References Cited in the file of this patent

UNITED STATES PATENTS

| | | |
|---|---|---|
| 2,643,515 | Harsch | June 30, 1953 |
| 2,787,383 | Antos et al. | Apr. 2, 1957 |
| 2,841,960 | Holan et al. | July 8, 1958 |
| 2,911,111 | Grove | Nov. 3, 1959 |
| 2,961,102 | Pitman | Nov. 22, 1960 |